United States Patent
Omori et al.

(10) Patent No.: US 6,969,107 B2
(45) Date of Patent: Nov. 29, 2005

(54) VEHICLE DOOR

(75) Inventors: Toshihisa Omori, Wako (JP); Kenichi Kitayama, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/499,170

(22) PCT Filed: Jan. 9, 2003

(86) PCT No.: PCT/JP03/00124

§ 371 (c)(1),
(2), (4) Date: Jun. 14, 2004

(87) PCT Pub. No.: WO03/059669

PCT Pub. Date: Jul. 24, 2003

(65) Prior Publication Data

US 2005/0017538 A1 Jan. 27, 2005

(30) Foreign Application Priority Data

Jan. 16, 2002 (JP) .............................. 2002-007994

(51) Int. Cl.⁷ ................................................ B60J 5/00
(52) U.S. Cl. ............................... 296/146.6; 296/187.12
(58) Field of Search .......................... 296/146.5, 146.6, 296/187.12

(56) References Cited

U.S. PATENT DOCUMENTS 3,868,141 A  *  2/1975  Johnson ................. 296/187.12
6,056,351 A        5/2000  Braitmaier
6,135,537 A       10/2000  Giddons
6,688,671 B2 *    2/2004  Fukutomi ................. 296/146.6
2001/0017476 A1 * 8/2001  Nishikawa et al. ....... 296/146.6

FOREIGN PATENT DOCUMENTS

EP   1 129 877    6/2001
FR   2 745 241    8/1997
JP   07025236 A   1/1995

OTHER PUBLICATIONS

Tikal et al. "Montageverbesserungen verwirklicht durch eine Magnesium-Druckguβ-Konstruktion" 98(11):626-628 (1996).

* cited by examiner

Primary Examiner—Dennis H. Pedder
(74) Attorney, Agent, or Firm—Fish & Richardson P.C.

(57) ABSTRACT

A vehicle door (10) includes an inner door panel (11). The inner door panel includes a door frame (20) and elongated members (25, 26). The elongated members extend in a front-and-rear direction of a vehicle body. The elongated members have fragile sections (60) each extending in a widthwise direction of the vehicle body to provide a stepped portion. The fragile section fractures under the action of a fracturing stress produced when a compression force (FO) greater than predetermined intensity acts on the elongated members. One element of the elongated member having the thus fractured fragile section then moves to absorb the compression force, thereby enhancing a passenger protecting performance of the vehicle door.

3 Claims, 7 Drawing Sheets

VEHICLE DOOR

TECHNICAL FIELD

The present invention relates to a technique for improving performance of a door to protect a passenger or driver (hereinafter, generically referred to as a passenger) in a motor vehicle.

BACKGROUND ART

In recent years, techniques have been developed for protecting a passenger of a vehicle from a collision force acting on the vehicle. For enhanced passenger protecting performance, there has been a demand for reconsideration of the overall vehicle body structure including doors. As an example of a vehicle door designed to enhance the passenger protecting performance, there is known a "vehicle door structure" disclosed in Japanese Patent Laid-open Publication No. HEI-7-25236.

The disclosed vehicle door structure includes an opening portion in an upper area of a door body composed of inner and outer panels, and a window panel is provided in the opening portion for up-and-down movement through the opening.

To secure necessary structural rigidity of the opening portion, reinforcements are provided respectively in an upper portion of the inner panel and upper inner portion of the outer panel and extend along the opening portion. Each of these reinforcements has a recessed portion formed therein to be located forwardly of a hip point of the passenger. When an external force has acted on the door body from sideways of the vehicle, namely, a certain object has collided with a side door of the vehicle, the reinforcements deform plastically, at the position of the recessed portions, toward the interior of a vehicle compartment, so that the collision energy can be absorbed by the plastic deformation of the reinforcements. Thus, a collision impact applied to the passenger can be alleviated, which thereby enhances the passenger protecting performance of the vehicle door.

For the aforementioned vehicle door having the reinforcements designed to deform plastically towards the interior of the vehicle compartment when the external force acts on the vehicle door from sideways, however, the reinforcements are not designed allowing for occurrence of impact or collision on a front part of the vehicle. In other words, no measure is taken against application of an external force to the vehicle from a front side of the vehicle. There has been needed a vehicle door designed to ensure the enhanced passenger protecting performance even when the vehicle is subjected to the external force from the front side thereof.

DISCLOSURE OF THE INVENTION

According to one aspect of the present invention, there is provided a vehicle door including an inner door panel and being attachable to a vehicle body, the inner door panel comprising: a door frame; elongated members extending in a front-and-rear direction of the vehicle body within the door frame; the elongated members each including: a pair of elements extending in the front-and-rear direction of the vehicle body; fragile sections each extending, in a widthwise direction of the vehicle body, between the pair of elements to provide a stepped portion; and the fragile section being designed to be fractured by a fracturing stress when a compression force greater than predetermined intensity acts on the elongated members.

When collision force acts on the door from ahead of the vehicle body, the fragile section which provides a stepped portion is fractured under the action of a fracturing stress. Fracturing of the fragile section causes one of the pair of elements extending in the front-and-rear direction of the vehicle body to move rearward to absorb collision energy. Use of the inner door panel makes it possible to promptly reduce or absorb enough of the collision energy from ahead of the vehicle. In addition, by setting, as appropriate, the locations of the fragile sections on the elongated members, it is possible to clearly identify positions where fracture occurs when a collision force acts on the door from ahead of the vehicle body. Therefore, it suffices to just set appropriate locations of the fragile sections such that the passenger protecting performance can be enhanced.

Preferably, the elongated member has the fragile sections provided at a front or rear part thereof, and has a longitudinally-middle portion thereof located farther from a vehicle compartment of the vehicle body than the front or rear part. This means that, of the elongated members, the shorter element extending from the high-rigidity door frame to the stepped portion is disposed closer to the interior of the vehicle compartment. Thus, the shorter element has greater rigidity than the longer element. Therefore, in case the stepped portion fractures, it is possible to minimize adverse influences on the interior of the vehicle compartment.

Preferably, the inner door panel is formed by casting. It is easier to set a shape and size of the stepped portion of the fragile section, i.e., shapes and sizes of the pair of elements extending in the front-and-rear direction of the vehicle body and of the stepped portion extending in the widthwise direction of the vehicle body, and thereby set the fracturing portion with higher accuracy, than in a case where the inner door panel is press-formed.

BRIEF DESCRIPTION OF THE DRAWINGS

Certain preferred embodiments of the present invention will be described in detail below, by way of example only, with reference to the accompanying drawings, in which.

BEST MODE FOR CARRYING OUT THE INVENTION

Figure 1:
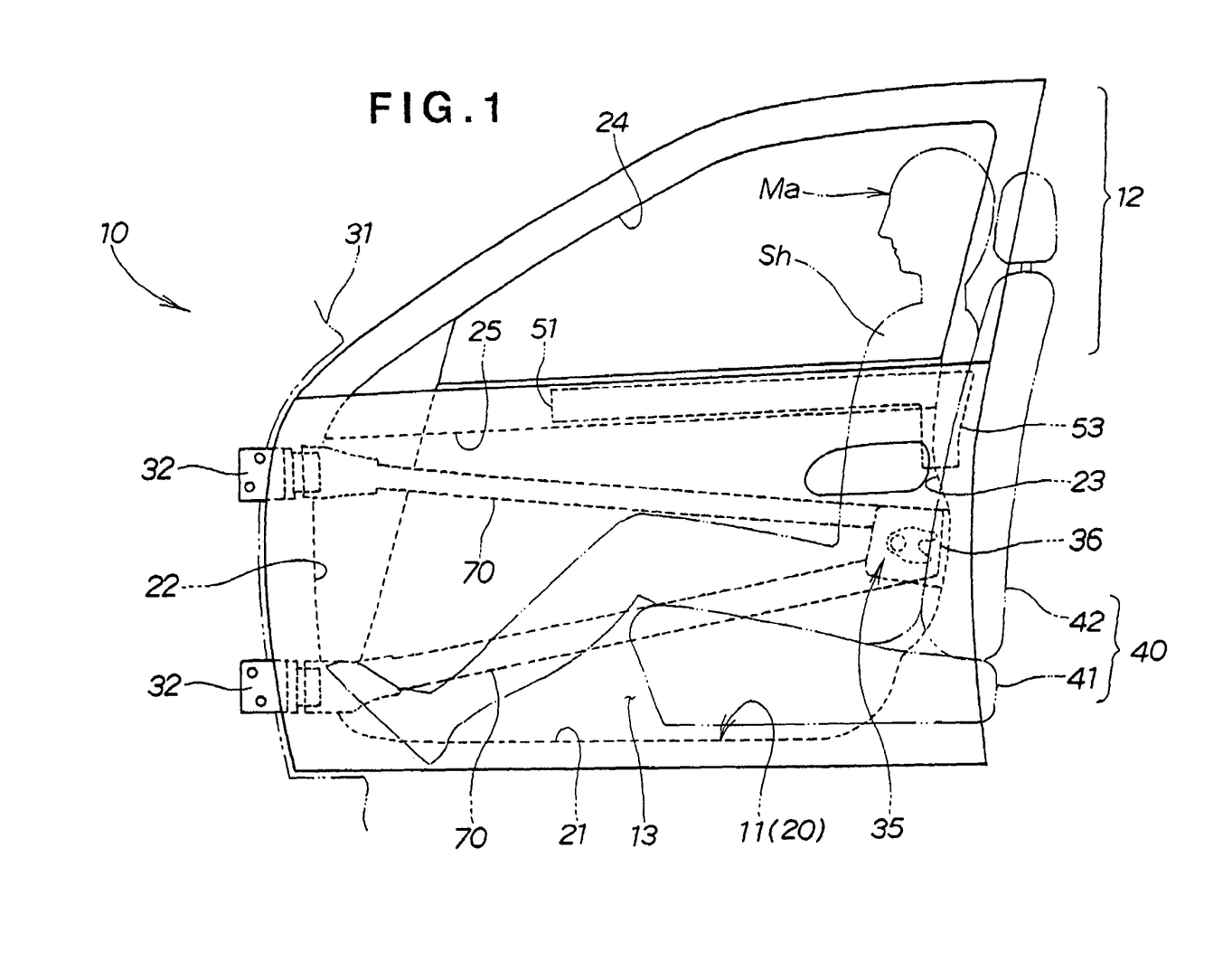
FIG. 1 is a side view of a vehicle door in accordance with an embodiment of the present invention.

FIG. 1 shows a structure of a left front door 10 of a full-door type vehicle as viewed from a left side of the door 10. The door 10 is composed of an inner door panel 11 having a window sash 12 formed integrally with an upper end portion thereof, and an outer door panel 13 joined with an outer side—i.e., a side facing a viewer of the figure—of the inner door panel 11. The door 10 is mounted for opening and closing movement with a door frame 20 of the inner door panel 11 attached via upper and lower hinges 32 to a vehicle body 31 denoted by a phantom line in the figure, and it is held in the closed position by means of a door lock section 35 secured to the door frame 20.

The window sash 12 is a component holding therein a door glass (not shown) in such a manner that the glass can be raised and lowered along the sash 12. In this description, the terms "inner door panel" collectively refer to a combination of the panel 11 and window sash 12.

The door frame 20 of the inner door panel 11 includes a horizontal lower frame member 21, a front frame member 22 extending upward from the front end of the lower frame member 21, a rear frame member 23 extending upward from the rear end of the lower frame member 21, and an upper frame member 24 extending between the respective top ends of the front frame member 22 and rear frame member 23.

The inner door panel 11 is formed of a magnesium alloy material with a view to reducing its weight; for example, the inner door panel 11 is made by casting (preferably, die-casting) such a magnesium alloy material. This is because a magnesium alloy material has a low melting point and presents a good fluid flow capability. For example, a magnesium alloy diecasting of Type B (JIS H5303, MD2B) is preferable.

The outer door panel 13 is made by press-forming a sheet-shaped material, such as a magnesium alloy sheet, aluminum alloy sheet or steel sheet.

Further, in FIG. 1, there is also shown a relationship between the door 10 and a seat 40 for a passenger Ma (i.e., driver's or passenger's seat). The passenger seat 40, denoted by a phantom line in the figure, includes a seat cushion 41 and a seat back 42. The seat cushion 41 is disposed near a rear lower portion of the door frame 20, while the seat back 42 is disposed near a rear portion of the door frame 20.

The door frame 20 includes a first elongated member 25 extending substantially horizontally and facing a side surface of the seat back 42 retained in an upright position. Thus, the first elongated member 25 substantially faces a shoulder Sh of the passenger Ma. The first elongated member 25 is a reinforcing member extending between the top end of the front frame member 22 and a height-wise middle portion of the rear frame member 23.

Figure 2:
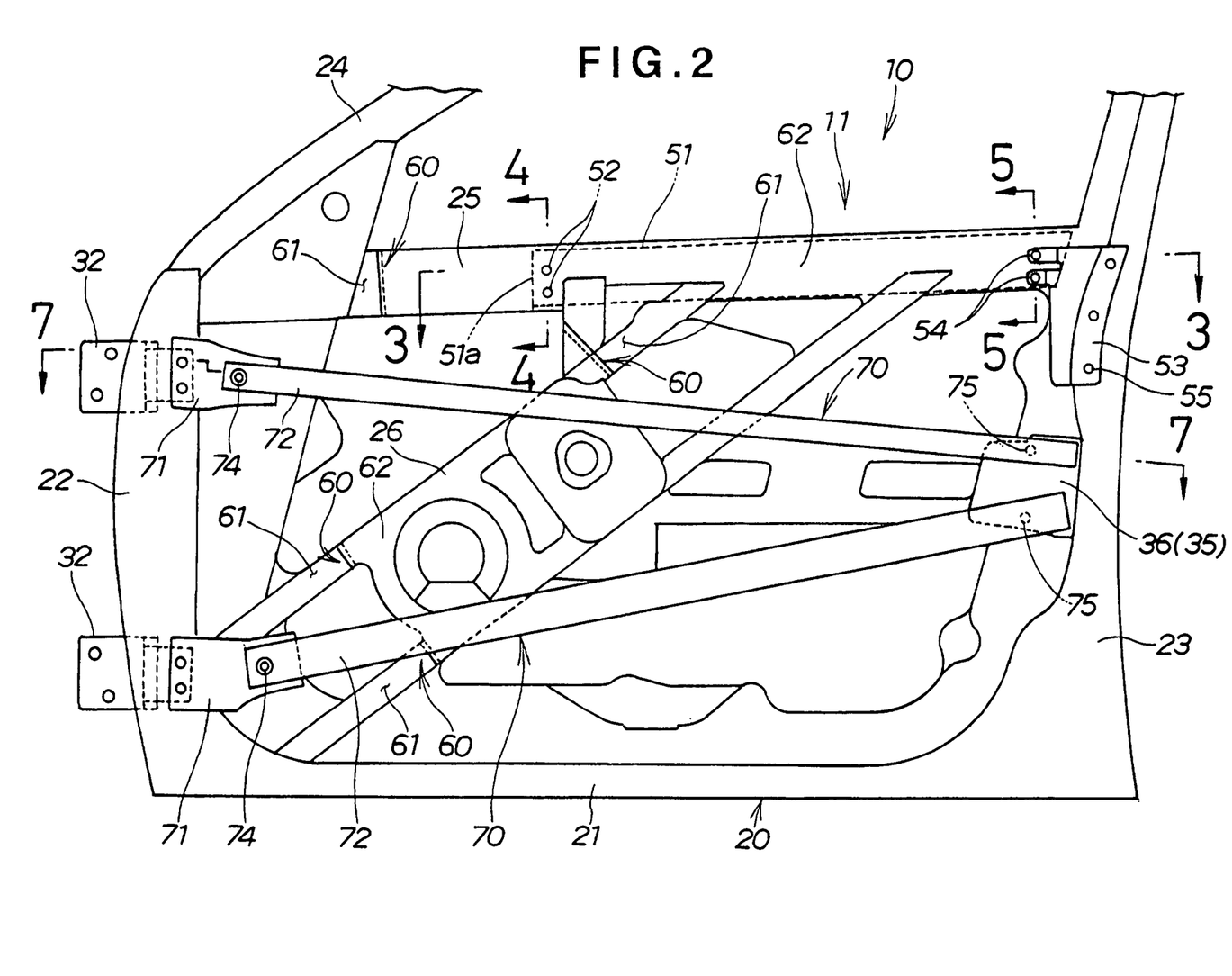
FIG. 2 is a side view showing a lower half of an inner door panel of the vehicle door of the present invention.

FIG. 2 shows a lower half of the inner door panel 11, which includes the door frame 20 and a plurality of elongated members (the above-mentioned first elongated member 25 and a second elongated member 26) extending in the front-and-rear direction of the vehicle body within the door frame 20. Specifically, the first elongated member 25 and second elongated member 26 are elongated door beams formed integrally with the door frame 20. The second elongated member 26 extends from a front lower portion (i.e., a corner between the lower frame member 21 and the front frame member 22) of the door frame 20 obliquely toward a rear end portion of the first elongated member 25.

The first elongated member 25 has one fragile section 60 at its front end, and the second elongated member 26 has two fragile sections 60 at its front end and one fragile section 60 at its rear end. These fragile sections 60 are located at given distances from the passenger Ma seated on the seat 40 shown in FIG. 1. Details of the fragile sections 60 will be discussed later.

The front frame member 22 has the two hinges 32 secured to its upper and lower portions. The rear frame member 23 has the door lock section 35 secured to a height-wise or vertically middle portion thereof that corresponds generally to a midpoint between the upper and lower hinges 32 of the front frame member 22.

The door frame 20 includes a door beam 70 connected between the secured positions of the upper hinge 32 and door lock section 35, and another door beam 70 connected between the secured positions of the lower hinge 32 and door lock section 35.

Figure 3:
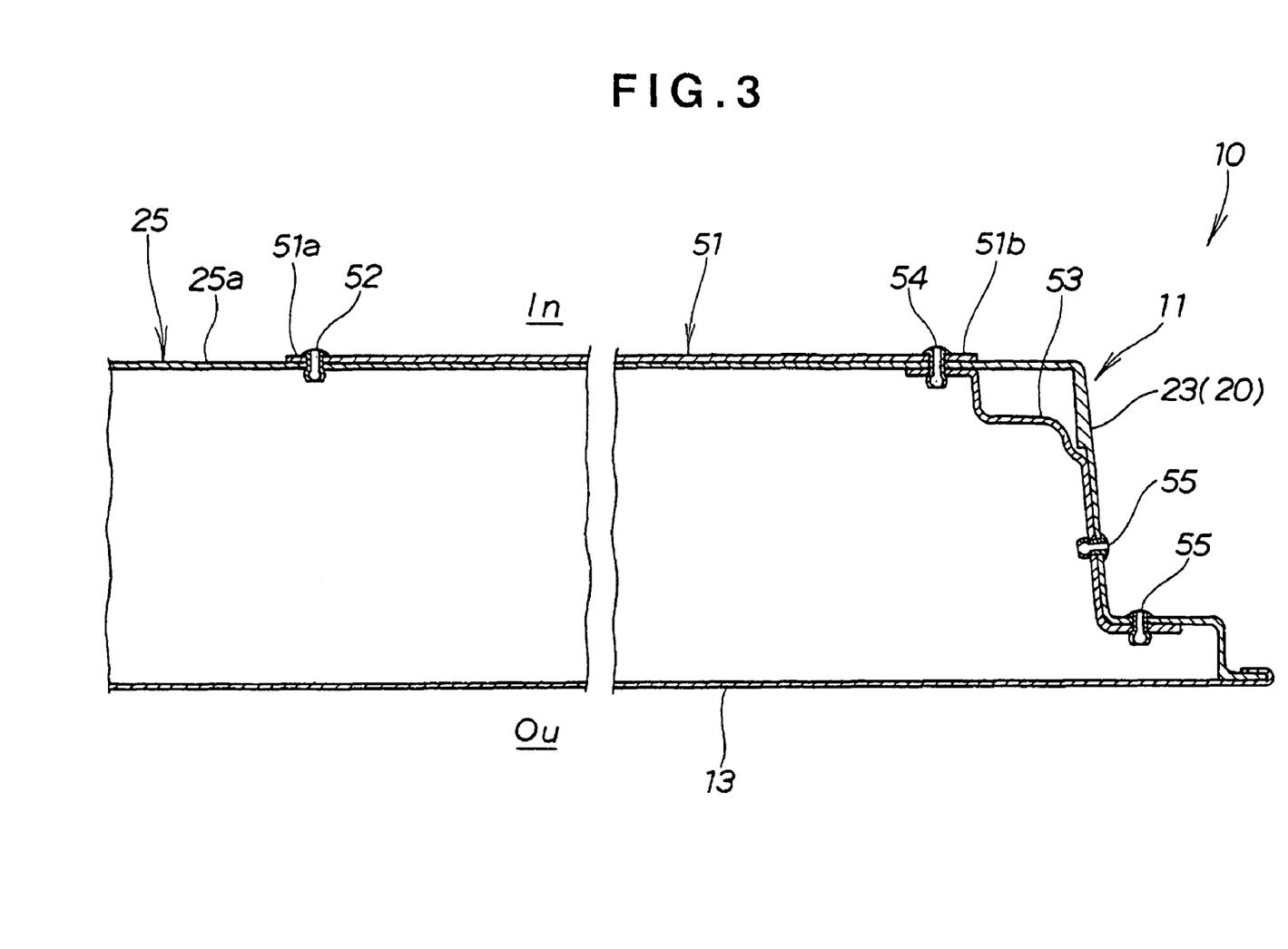
FIG. 3 is a sectional view taken along line 3—3 of FIG. 2.

FIG. 3 is a sectional plan view of the rear frame member 23 and first elongated member 25. The first elongated member 25 has an inner wall surface 25a facing the interior of a vehicle compartment In and a passenger protecting cover 51 secured to the surface 25a in overlapped relation thereto. The passenger protecting cover 51 is a press-formed sheet of a relatively lightweight aluminum alloy that has greater toughness than the magnesium alloy used in the inner door panel 11. The "toughness" represents how tenacious and how difficult the material is to fracture or break due to an external impact.

Front end portion 51a of the passenger protecting cover 51 is secured locally to a front portion of the first elongated member 25 of the inner door panel 11 in overlapped relation by means of a plurality of rivets 52. Rear end portion 51b of the passenger protecting cover 51 is secured locally to a bracket 53, along with the first elongated member 25, in overlapped relation to the bracket 53, by means of a plurality of rivets 54. The bracket 53 is secured locally to the rear frame member 23 of the door frame 20 by means of a plurality of rivets 55.

Figure 4:
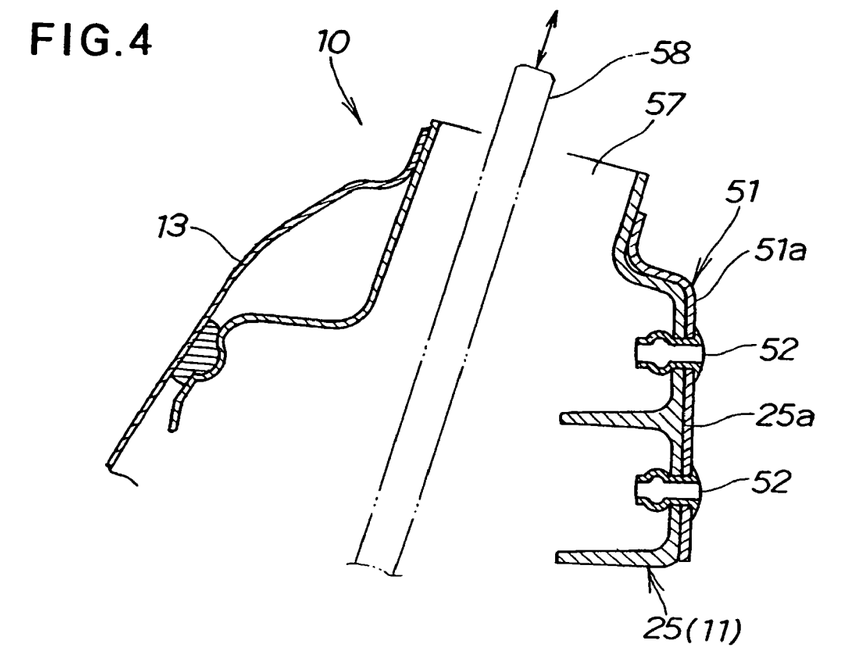
FIG. 4 is a sectional view taken along line 4—4 of FIG. 2.

FIG. 4 shows in detail how the front end portion 51a of the passenger protecting cover 51 is secured to the first elongated member 25 in overlapped relation by means of the plurality of rivets 52.

FIG. 4 also shows a door glass 58 accommodated in an opening 57 between the first elongated member 25 and the outer door panel 13 for closing/opening vertical movement through the opening 57.

Figure 5:
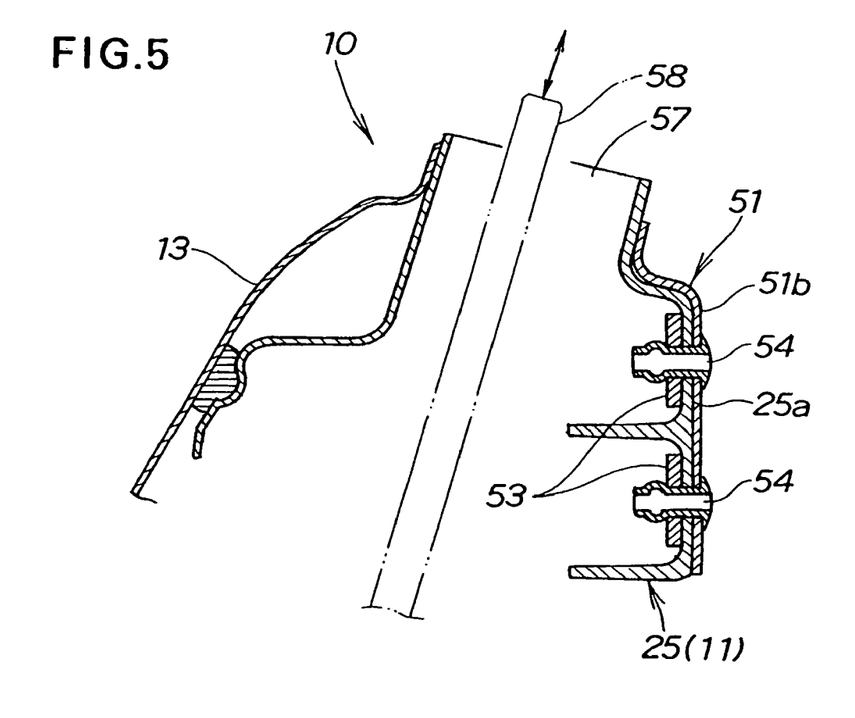
FIG. 5 is a sectional view taken along line 5—5 of FIG. 2.

FIG. 5 shows in detail how the rear end portion 51b of the passenger protecting cover 51 is secured to the bracket 53, together with the first elongated member 25, in overlapped relation to the bracket 53, by means of the plurality of rivets 54.

Referring back to FIG. 1, because the first elongated member 25 faces the seat 40, the passenger protecting cover 51 is also positioned in a portion of the inner door panel 11 which faces at least the seat 40 or vicinity thereof. Further, the inner door panel 11 and passenger protecting cover 51 are secured together to the bracket 53 in overlapped relation thereto in the portion facing the seat 40 or vicinity thereof.

Figure 6A:
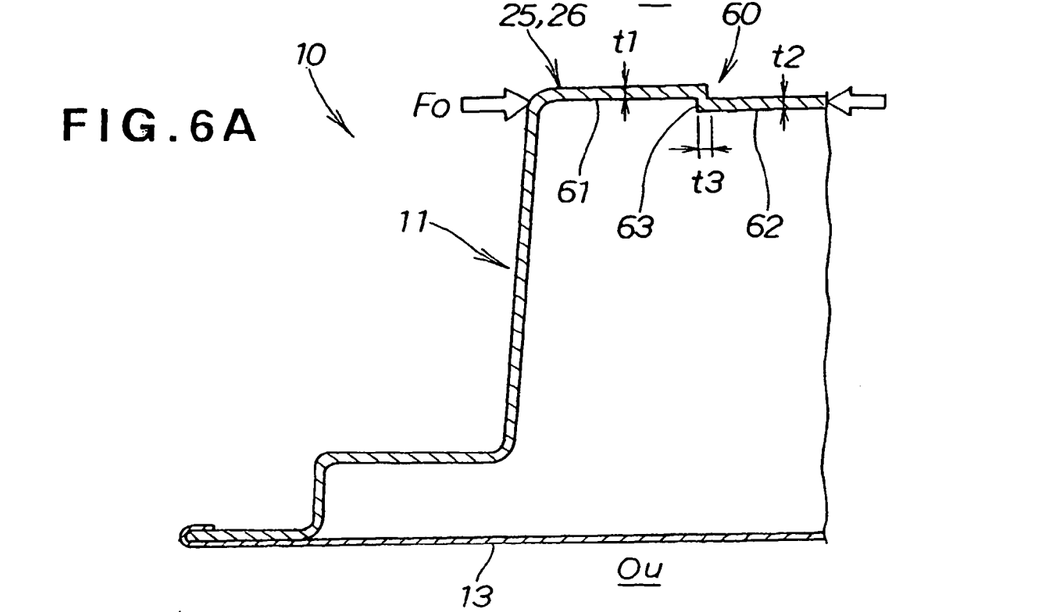
FIG. 6A is a sectional plan view of first and second elongated members having fragile sections.
Figure 6B:
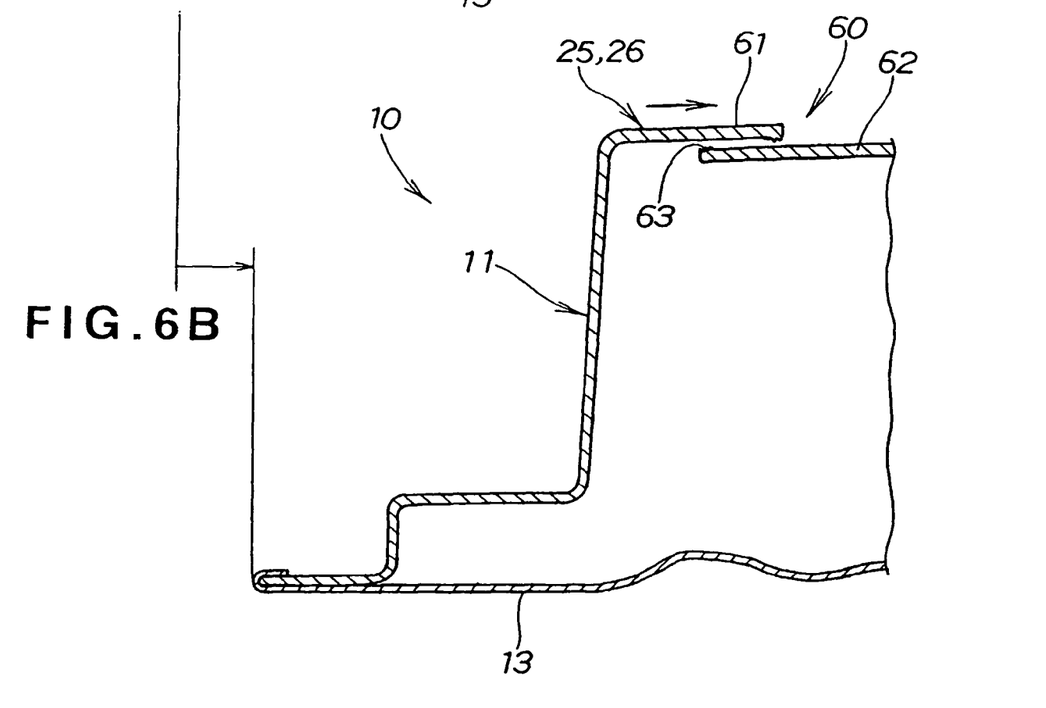
FIG. 6B is a view showing one of the first and second elongated members having fractured in the fragile section.

FIGS. 6A and 6B show sections of the first and second elongated members 25 and 26, and FIG. 6B particularly shows the fragile section 60 in a fractured state.

The fragile section 60 is a portion that is designed to be fractured by a fracturing stress when a compression force greater than predetermined intensity acts on the first and second elongated members 25 and 26 in a longitudinal direction thereof. The fragile section 60 is formed integrally with the first and second elongated members 25 and 26.

Specifically, each of the fragile sections 60 is a stepped portion formed by a short connecting portion (fracturing portion) 63 extending, in the widthwise direction of the vehicle body, between a pair of first and second elements 61 and 62 extending generally serially in the front-and-rear direction of the vehicle body. The second element 62, as a longitudinally-middle portion of each of the first and second elongated members 25 and 26, is located closer to the outside Ou of the vehicle (farther from the vehicle compartment) than the first element 61. Respective wall thicknesses t1, t2 and t3 of the first element 61, second element 62 and fracturing portion 63 are generally identical to each other.

Behavior of each of the fragile sections 60 will now be described with reference to FIGS. 6A and 6B. The fracturing portion 63 can fracture when a compression force greater than predetermined intensity acts on the first and second elongated members 25 and 26 in the longitudinal direction thereof as seen in FIG. 6A. Namely, when a collision force Fo acts on the inner door panel 11 from ahead of the vehicle body, the fracturing portion 63 fractures due to the collision force Fo. As a consequence, the first element 61 moves rearward relative to the second element 62 as illustrated in FIG. 6B, so that the collision energy from ahead of the vehicle body can be absorbed and lessened by the inner door panel 11 promptly and even more effectively.

In addition, by setting, as appropriate, the locations of the fragile sections 60 on the first and second elongated members 25 and 26, it is possible to clearly identify positions where fracture occurs when a collision force acts on the door 10 from ahead of the vehicle body. Therefore, it suffices to just set appropriate locations of the fragile sections 60 such that the passenger protecting performance can be enhanced.

With such arrangements, the instant embodiment can enhance the passenger protecting performance of the vehicle door 10 against a collision force Fo imparted from ahead of the vehicle body.

Further, the door frame 20 has relatively great rigidity. Of the first and second elongated members 25 and 26, the shorter element (first element 61) extending from the high-rigidity door frame 20 to the stepped portion is disposed closer to the interior of the vehicle compartment In. Thus, the shorter element has greater rigidity than the longer element (second element 62). Therefore, in case the stepped portion fractures, it is possible to minimize adverse influences on the interior of the vehicle compartment In.

Moreover, in the instant embodiment where the inner door panel 11 is formed by casting, it is easier to set a shape and size of the stepped portion of the fragile section 60, i.e. shapes and sizes of the pair of elements (first and second elements 61 and 62) extending in the front-and-rear direction of the vehicle body and of the shorter element (fracturing portion 63) extending in the widthwise direction of the vehicle body, and thereby set the fracturing portion with higher accuracy, than in a case where the inner door panel 11 is press-formed.

Figure 7:
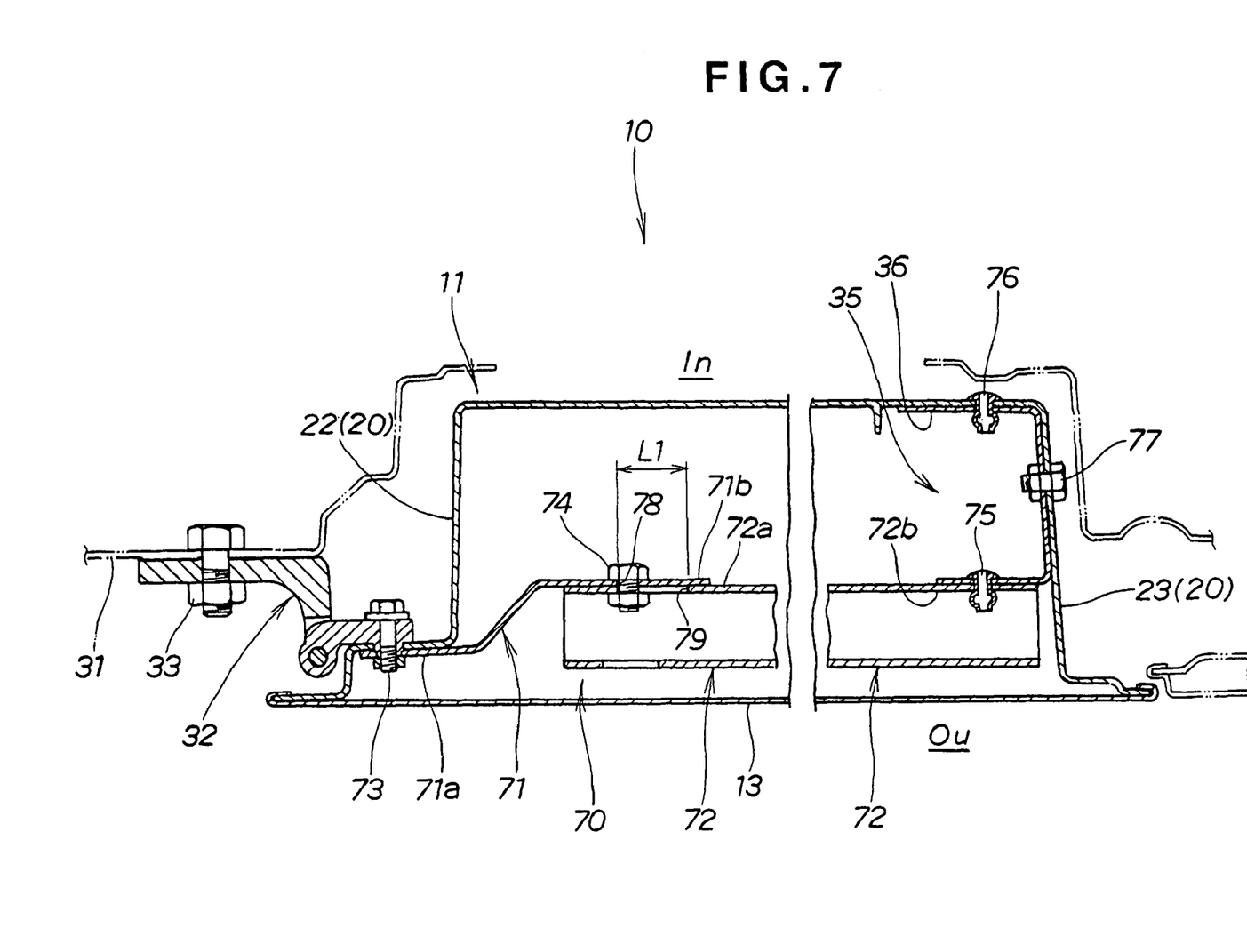
FIG. 7 is a sectional view taken along the 7—7 line of FIG. 2.

FIG. 7 shows a sectional structure of the door beam 70 referred to earlier in relation to FIG. 2. The door beam 70 in the instant embodiment includes a series of dividing members (first and second dividing members 71 and 72), which have their respective end portions 71b and 72a overlapped with each other in the widthwise direction of the vehicle body and joined with each other in such a manner that the dividing members are movable relative to each other by a predetermined distance when a compression force greater than predetermined intensity acts on the door beam 70.

Specifically, in the illustrated example, the dividing members include the first dividing member 71 positioned closer to the hinge 32 and second dividing member 72 positioned closer to the door lock section 35, and the mutually-joined areas of the end portions 71b and 72a are located near the hinge 32. The first dividing member 71 is located closer to the interior of the vehicle compartment In than the second dividing member 72.

One element of the hinge 32 is fixed, via a bolt and nut fastener 33, to the vehicle body 31 denoted by a phantom line, while the other element of the hinge 32 is fixed, via a bolt 73, to the front frame member 22 along with a front end portion 71a of the first dividing member 71. The front end portion 72a of the second dividing member 72 is overlapped over the rear end portion 71b of the first dividing member 71 in the widthwise direction of the vehicle body and joined, via a bolt 74, with the rear end portion 71b of the first dividing member 71. Further, a rear end portion 72b of the second dividing member 72 and a bracket 36 of the door lock section 35 are overlapped with each other in the widthwise direction of the vehicle body and joined with each other by a rivet 75. The bracket 36 and rear frame member 23 are coupled with each other by a rivet 76 and bolt and nut fastener 77.

The rear end portion 71b of the first dividing member 71 is located closer to the interior of the vehicle compartment In than the front end portion 72a of the second dividing member 72.

The door lock section 35 comprises a conventional mechanism including a latch member (not shown) that is fixed to the bracket 36 and engages a striker (not shown) fixed to the vehicle body 31. The bracket 36 and first and second dividing members 71 and 72 are each a press-formed sheet of an aluminum alloy material.

More specifically, the corresponding end portions 71b and 72a of the first and second dividing members 71 and 72 are joined with each other in either of two manners to be explained in (1) and (2) below.

(1) Round hole 78 is formed in the rear end portion 71b of the first dividing member 71 to extend there through in the widthwise direction of the vehicle body, and a hole 79, elongated in the longitudinal direction of the door beam 70, is formed in the front end portion 72a of the second dividing member 72 to extend there through in the widthwise direction of the vehicle body. Then, the end portions 71b and 72a are coupled with each other by the bolt 74 extending through the round hole 78 and elongated hole 79.

(2) Hole 79, elongated in the longitudinal direction of the door beam 70, is formed in the rear end portion 71b of the first dividing member 71 to extend therethrough in the widthwise direction of the vehicle body, a round hole 78 is formed in the front end portion 72a of the second dividing member 72 to extend therethrough in the widthwise direction of the vehicle body, and the end portions 71b and 72a are joined together via the bolt 74.

The elongated hole 79 has a length L1, which determines a range over which the first and second dividing elements 71 and 72 are movable relative to each other.

Figure 8A:
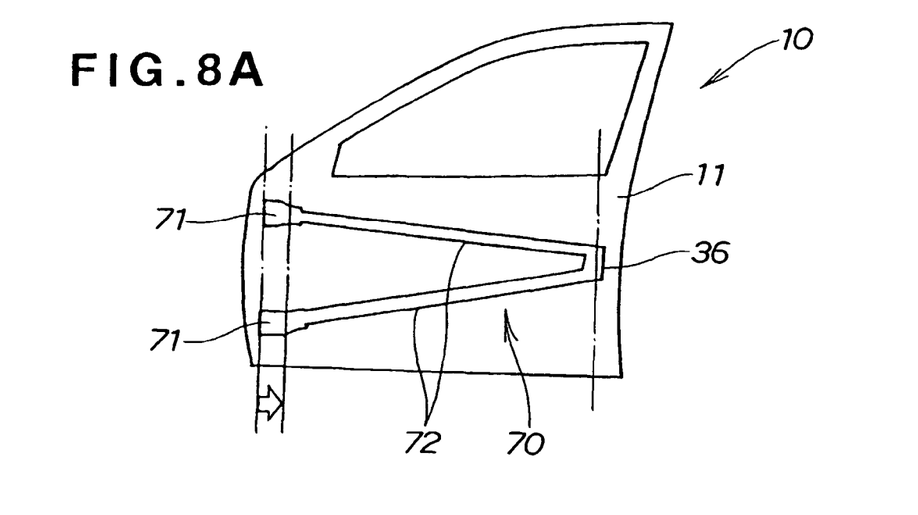
FIG. 8A is a schematic side view of the vehicle door having a door beam.
Figure 8B:
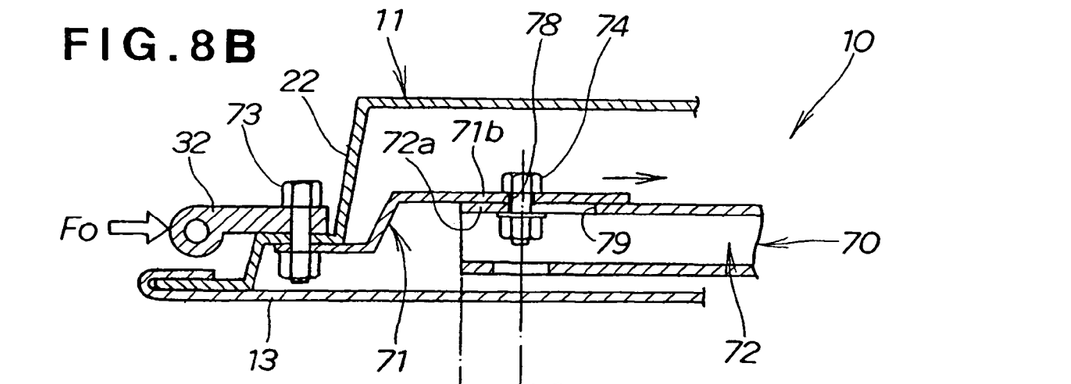
FIG. 8B is a view showing a state of the vehicle door at a moment when a collision force has acted on the door beam.
Figure 8C:
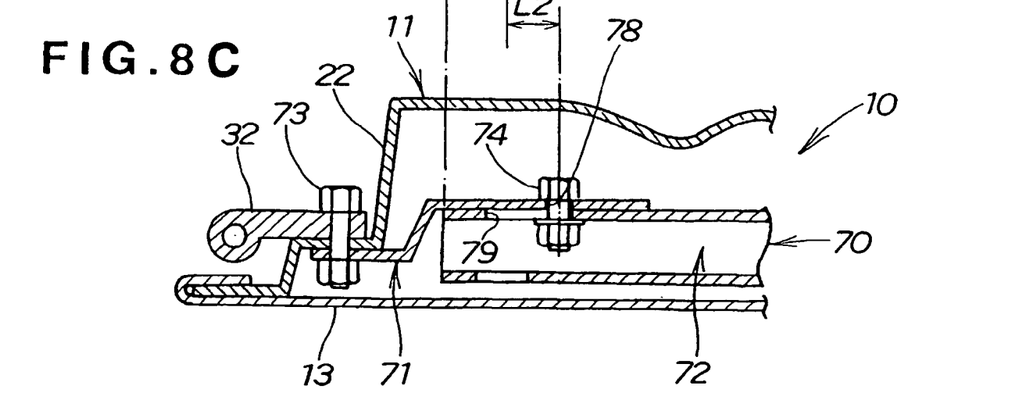
FIG. 8C is a view showing a state of the vehicle door immediately after the collision force has acted on the door beam and a first dividing element has moved rearward relative to a second dividing element.

FIG. 8A is a schematic side view of the door 10, FIG. 8B shows a state of the vehicle door when a collision force Fo has acted on the door beam 70, and FIG. 8C shows a state of the vehicle door immediately after the collision force Fo has acted on the door beam 70.

In FIGS. 8A and 8B, when a compressing force greater than predetermined intensity has acted on the door beam 70 in the longitudinal direction thereof, the compressing force exceeds friction occurring between the end portions 71b and 72a through the tightening by the bolt 74. As a consequence, the first and second dividing elements 71 and 72 can move relative to each other.

When the collision force FO acts on the door beam 70 by way of the hinge 32 from ahead of the vehicle body, the collision force Fo is transmitted from the first element 71, via the round hole 78, to the bolt 74. Once the collision force Fo exceeds the friction between the end portions 71b and 72a, the first dividing element 71 moves rearward relative to the second dividing element 72 as illustrated in FIG. 8C. Note that a distance L2 over which the first and second dividing elements 71 and 72 can move relative to each other depends on the length L1 (see FIG. 7) of the elongated hole 79. In the above-described manner, the collision energy can be absorbed.

It should be appreciated that the vehicle door 10 embodying basic principles of the present invention is not limited to the left front door and may be the right front door, left rear door or right rear door.

Further, the vehicle door 10 embodying the present invention is not limited to the full door type; for example, it may be a sash-equipped door having a separate sash body secured to an upper portion of the inner door panel or a sash-less door.

Furthermore, the inner door panel 11 in the present invention is not limited to one made of a magnesium alloy material; for example, it may be made of an aluminum alloy or steel. Moreover, the inner door panel 11 may be made by press-forming rather than by casting.

Moreover, the passenger protecting cover 51 may be made of any other suitable material than a nonferrous material like an aluminum alloy, such steel, hard rubber or engineering plastics, as long as the material of the protecting cover 51 has greater "toughness" than the inner door panel 11.

In addition, the arrangement for fixing the passenger protecting cover 51 to the inner door panel 11 may be chosen as appropriate taking the material of the cover 51 into consideration; for example, the passenger protecting cover 51 may be fixed to the inner door panel 11 by bolts, spot-welding rather than by rivets.

INDUSTRIAL APLICABILITY

According to the present invention, when the collision force acts on the inner door panel from ahead of the vehicle body, the fragile section(s) each providing a stepped portion formed on the elongated member of the inner door panel fracture under the action of fracturing stress. One element of the elongated member then moves rearward to absorb collision energy. This becomes possible to enhance the passenger protecting performance of the vehicle door. The thus arranged vehicle door is advantageous and useful in applications to the automobile industry.

What is claimed is:

1. A vehicle door including an inner door panel and being attachable to a vehicle body, said inner door panel comprising:
    a door frame;
    elongated members extending in a front-and-rear direction of the vehicle body within said door frame;
    said elongated members each including:
        a pair of elements extending in the front-and-rear direction of the vehicle body;
        a fragile section extending, in a widthwise direction of the vehicle body, between the pair of elements to provide a stepped portion; and
        said fragile section being designed to be fractured by a fracturing stress when a compression force greater than predetermined intensity acts on the elongated members.

2. A vehicle door according to claim 1, wherein each of said elongated members has its respective fragile section provided at a front or rear part thereof, and has a longitudinally-middle portion thereof located farther from a vehicle compartment of the vehicle body than the front or rear part where the fragile section is provided.

3. A vehicle door according to claim 1, wherein said inner door panel is formed by casting.

* * * * *